3,843,391
PROCESS FOR FINISHING TEXTILES
Rosemarie Toepfl, Dornach, Solothurn, Heinz Abel, Reinach, Basel-Land, and Arthur Maeder, Therwil, Basel-Land, Switzerland, assignors to Ciba-Geigy AG, Basel, Switzerland
No Drawing. Original application Nov. 3, 1970, Ser. No. 86,640, now abandoned. Divided and this application May 1, 1972, Ser. No. 249,014
Claims priority, application Switzerland, Nov. 10, 1969, 16,655/69
Int. Cl. D06m 3/02; C09d 3/58
U.S. Cl. 117—141
16 Claims

ABSTRACT OF THE DISCLOSURE

A process for finishing textiles, more particularly for rendering wool non-felting with stable preparations of reaction products of epoxides, polymeric fatty acids and amines is provided. The reaction products are made by reacting an epoxide-polymeric fatty acid reaction product with an amine or ammonia.

---

This application is a division of application Ser. No. 86,640 filed Nov. 3, 1970, now abandoned.

The subject of the invention is a process for the manufacture of stable preparations of reaction products of epoxides, polymeric fatty acids and amines, characterised in that (a) a reaction product of at least (a') one epoxide which contains at least two epoxide groups per molecule and at least (a") one polymeric unsaturated fatty acid, with the ratio of equivalents of epoxide groups to acid group being 0.45:1 to 0.95:1, is reacted with (b) an amine containing at least one amino group and exclusively basic nitrogen atoms, or ammonia, and optionally (c) an aliphatic or aromatic diisocyanate, in the presence of an organic solvent, with the ratio of equivalents of acid group to hydrogen bonded to amine nitrogen, to tertiary amino groups or to ammonia being 1:1 to 1:10, and of acid groups to optionally present isocyanate groups being 1:0.1 to 1:1.5, and that, not later than on completion of the reaction, steps are taken, where appropriate through addition of a base, that a sample of the reaction mixture, after dilution with water, has a pH value of 7.5 to 12.

The epoxides (a'), from which the component (a) is obtained, are preferably derived from polyhydric phenols or polyphenols, such as resorcinol, or phenol-formaldehyde condensation products of the type of the resols or novolaks. Bisphenols, such as bis-(4 - hydroxyphenyl)-methane and above all 2,2-bis-(4'-hydroxyphenyl)-propane, are especially preferred as starting compounds for the manufacture of the epoxides.

Special mention should here be made of epoxides of 2,2 - bis - (4'-hydroxyphenyl)-propane which have an epoxide content of 1.5 to 5.8 epoxide group equivalents/kg., but preferably of at least 5 epoxy group equivalents/kg., and which correspond to the formula (1) 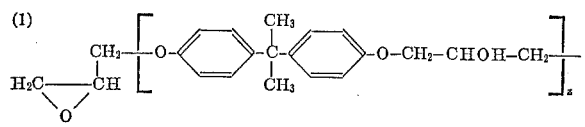

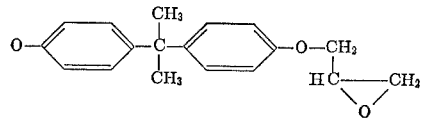

wherein z denotes an average number having a value of 0 to 0.65. Such epoxides are obtained by reaction of epichlorohydrin with 2,2-bis-(4'-hydroxyphenyl)-propane.

Aliphatic, ethylenically unsaturated dimeric to trimeric fatty acids have proved to be very suitable components (a"). Preferably, the reaction products (a) are here manufactured from the epoxides (a') and aliphatic unsaturated dimeric to trimeric fatty acids (a") which are derived from monocarboxylic acids with 16 to 22 carbon atoms. These monocarboxylic acids are fatty acids with at least one, and preferably 2 to 5, ethylenically unsaturated bonds. Representatives of this class of acids are, for example, oleic acid, hiragonic acid, eleostearic acid, licanic acid, arachidonic acid, clupanodonic acid and especially linoleic acid and linolenic acid. These fatty acids can be obtained from natural oils, in which they occur above all as glycerides.

The dimeric to trimeric fatty acids (a") used according to the invention are obtained in a known manner by dimerisation of monocarboxylic acids of the nature indicated. The so-called dimeric fatty acids always contain some trimeric acids and a small amount of monomeric acids.

Particularly suitable components (a") are dimerised to trimerised linoleic or linolenic acid. The technical products of these acids as a rule contain 75 to 95 percent by weight of dimeric acid, 4 to 25 percent by weight of trimeric acid and a trace, up to 3%, of monomeric acid. The molar ratio of dimeric to trimeric acid is accordingly about 5:1 to 36:1.

The reaction of the component (a') with the component (a") is appropriately carried out at 110 to 160° C., preferably 150° C.

According to the invention, the ratio of epoxides (a') to acids (a") in component (a) is so chosen that an excess of acid is used, so that there is less than one epoxide group per each carboxyl group of the acid. The reaction products (a) hence contain carboxyl end groups. According to the invention, the quantity of the components (a') and (a") should be fixed in such a way that the ratio of equivalents is 1 acid group to 0.45 to 0.95 epoxide group, that is to say the amount of acid corresponding to one acid group equivalent is reacted with the amount of epoxide which corresponds to an epoxide group equivalent of 0.45 to 0.95.

Component (b) can thus be ammonia or monoamines, diamines or polyamines of which the amino groups can be primary, secondary or tertiary. Preferably, these compounds are aliphatic amines, preferably having 2 to 10 carbon atoms.

However, amines containing at least two amino groups and exclusively basic nitrogen atoms, wherein the amino groups each at least possess one hydrogen atom bonded to nitrogen, or ammonia, are preferentially used.

Such diamines can be aliphatic or cycloaliphatic and preferably possess at least one primary amino group and a second amino group wherein at least one hydrogen atom is bonded to nitrogen. Furthermore, ammonia can also simply be employed as component (b). However, di-primary aliphatic or cycloaliphatic amines are preferred as component (b').

Suitable aliphatic amines are here above all polyamines such as diethylenetriamine, triethylenetetramine or tetraethylenepentamine, that is to say amines of formula (2) $H_2N—(CH_2—CH_2—NH)_n—CH_2—CH_2—NH_2$ wherein $n$ is equal to 1, 2 or 3.

In the case of amine mixtures, a non-integral average value can also be assumed, for example between 1 and 2.

Suitable cycloaliphatic amines are above all diprimary, cycloaliphatic diamines, which apart from the two amine nitrogen atoms only contain carbon and hydrogen, and which possess a saturated 5-membered to 6-membered carbocyclic ring, an $H_2N$ group bonded to a ring carbon atom, and an $H_2N-CH_2$ group bonded to another ring carbon atom.

3,5,5-trimethyl - 1 - amino-3-aminomethyl-cyclohexane or 1-amino-2-aminomethyl-cyclopentane may be mentioned as examples of such amines.

Further examples of monoamines and tertiary amines which may be mentioned are: triethylamine, diethylamine, ethylamine, isopropylamine and N-tetramethyl-ethylenediamine.

In addition to the components (a) and (b) it is also possible, as has been mentioned, further to use a third component (c), namely aromatic or preferably aliphatic diisocyanates, conjointly for the manufacture of the reaction products. Here, alkylenediisocyanates with 1 to 8 carbon atoms in the alkylene radical, such as for example hexamethylenediisocyanate, have proved particularly suitable. As an aromatic diisocyanate, those of the benzene series, for example toluene-2,4-diisocyanate, are preferred.

Possible organic solvents in the presence of which the reaction of the components (a), (b) and optionally (c) takes place, are above all water-soluble organic solvents, and in particular appropriately those that are miscible with water to an unlimited extent. As examples, dioxane, isopropanol, ethanol and methanol, ethylene glycol-n-butyl-ether (=n-butylglycol), and diethylene glycol-mono-butyl-ether may be mentioned.

At the same time it is, however, also possible to carry out the reaction in the presence of water-insoluble organic solvents, for example in hydrocarbons such as petrol, benzene, toluene and xylene, halogenated hydrocarbons such as methylene chloride, methylene bromide, chloroform, carbon tetrachloride, ethylene chloride, ethylene bromide, s-tetrachloroethane and above all trichloroethylene.

When component (c) is conjointly used, the reaction of the components (a), (b) and (c) can be carried out in various sequences. Either, (a) is first reacted with (b) and subsequently with (c), or (a) is first reacted with (c) and subsequently with (b). The reaction with (b) is appropriately carried out at 20 to 120° C. and the reaction with (c) at −10 to +50° C.

The reaction is carried out in such a way that polyaddition products which can be dissolved or dispersed in water are produced, by taking steps, not later than on completion of the reaction, where appropriate by addition of a base, that a sample of the reaction mixture diluted with water has a pH value of 7.5 to 12, preferably of 8 to 10. For this purpose, inorganic or organic bases, advantageously easily volatile bases such as ammonia, are for example used. Furthermore it is very advantageous to work at temperatures of at most 80° C., for example at 60 to 70° C., in the reaction of (a) and (b). When using ammonia as component (b), the reaction is appropriately carried out at room temperature. The solutions or disperons thus obtained, which where necessary, have been treated with a base and which appropriately have been adjusted to a content of 10 to 30% of reaction product by means of an organic solvent or preferably by means of water, are distinguished by high stability.

They can be used for various purposes, above all for finishing textiles. They are in particular suitable for rendering wool non-felting, by impregnating the wool with an aqueous liquor to which the preparation and, if desired, yet further additives, such as wetting agents, dispersing agents and/or acid have been added, then drying the wool and subjecting it to a treatment at elevated temperature. However, the process for dyeing wool and rendering it non-felting, in which, successively and in optional sequence, the wool is, on the one hand, dyed by the exhaustion method, and is, on the other hand, treated with the preparations according to the invention at temperatures of 35 to 100° C. and a pH value of 6 to 1, proves particularly advantageous. Dyeing and rendering non-felting can thereby be combined in a simple manner and carried out in the same apparatus, without the wool being taken out of the apparatus between the two processes.

Dyeing can here be carried out in the customary manner, which is in itself known, using any desired dyestuffs which can be used for wool, for example acid wool dyestuffs, 1:1 or 1:2 metal complex dyestuffs or reactive dyestuffs. Equally, the additives which are customary when dyeing wool can be used, such as sulphuric acid, acetic acid, sodium sulphate, ammonium sulphate and levelling agents, possible levelling agents being above all polyglycol compounds of higher aliphatic amines, which can optionally also be quaternised and/or esterified at the hydroxyl groups by polybasic acids.

The liquor which is used for the non-felting treatment contains, in addition to the preparation of the polyaddition product, also the requisite amount of acid for establishing the acid medium, for example sulphuric acid, hydrochloric acid, phosphoric acid or especially acetic acid. Furthermore, yet other salts, such as sodium sulphate, ammonium sulphate, sodium bisulphite or sodium thiosulphate, can be used. The liquors can however also contain yet other customary additives such as agents for softening the handle, or bleaching agents, for example hydrogen peroxide. These agents are preferably added to the preparation after the synthetic resin has been taken up on the wool.

The amount of the reaction product according to the invention (not including solvent and water), relative to the weight of the wool, is appropriately 0.5 to 5%, preferably 1.2 to 3%. As has been mentioned, the process is carried out at temperatures of 35 to 100° C., and in doing so, between 5 and 60 minutes is in most cases required for an extensive to practically complete fixing of the polyaddition product.

The sequence of the two processes is optional but in general it tends to be advantageous to dye first and carry out the non-felting treatment afterwards.

In the manufacturing instructions and examples which follow, percentages are percentages by weight.

Manufacturing instructions for components (a)

(A) 282 g. of a dimerised linoleic acid (1 acid equivalent) together with 95.5 g. (=0.5 epoxide group equivalent) of an epoxide formed from 2,2-bis-(4'-hydroxyphenyl)-propane and epichlorohydrin are warmed for 5 hours to 150° C. internal temperature, whilst stirring. The highly viscous, clear product has an acid number of 79 and an epoxide group content of 0.

(B) 282 g. of a dimerised linoleic acid (=1 acid equivalent) together with 134 g. (=0.7 epoxy group equivalent) of an epoxide according to instruction A, are warmed for 5 hours to 150° C. internal temperature, whilst stirring.

A highly viscous, clear product is obtained, having an acid number of 64 and an epoxide group content of 0.

(C) 282 g. of a dimerised linoleic acid (=1 acid equivalent) together with 153 g. (=0.8 epoxy group equivalent) of an epoxide according to instruction A are warmed for 6½ hours to 150° C. internal temperature, whilst stirring.

A highly viscous, clear product is obtained, having an acid number of 53 and an epoxide group content of 0.

(D) 282 g. of a dimerised linoleic acid (=1 acid equivalent) together with 172 g. (=0.9 epoxy group equivalent) of an epoxide according to instruction A are warmed for 7½ hours to 150° C. internal temperature, whilst stirring.

A highly viscous, clear product is obtained, having an acid number of 36 and an epoxide group content of 0.

(E) 296 g. of a mixture of 75% dimerised and 25% trimerised linoleic acid (=1 acid group equivalent) together with 132 g. of hexahydrophthalic acid diglycidyl ester (=0.8 epoxy group equivalent) are warmed for 2 hours to 120° C. internal temperature.

A highly viscous, clear product is obtained, having an acid number of 35.5 and an epoxy group content of 0.

(F) 282 g. of a dimerised linoleic acid (=1 acid group equivalent) together with 109.2 g. of an epoxide of formula (3) 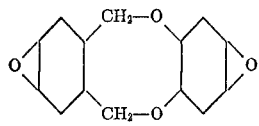

(=0.7 epoxy group equivalent) are reacted with 1¾ hours at 150° C. internal temperature.

A highly viscous, clear product is obtained, having an acid number of 61.5 and an epoxide group content of 0.

(G) 282 g. of a dimerised linoleic acid (=1 acid group equivalent) together with 80 g. of an epoxide of the following formula (4) 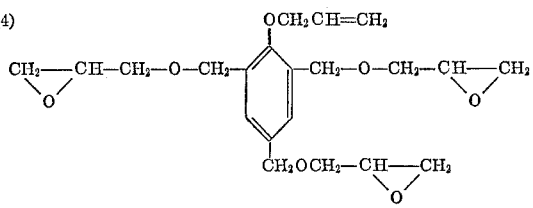

(=0.5 epoxy group equivalent) are warmed for 2¼ hours to 150° C. internal temperature.

A highly viscous, clear product is obtained, having an acid number of 113 and an epoxy group content of 0.27.

(H) 296 g. of a mixture of 75% dimerised and 25% trimerised linoleic acid (=1 acid group equivalent) together with 83.2 g. of triglycidyl isocyanurate (=0.5 epoxy group equivalent) are warmed for 1¾ hours to 120° C. internal temperature.

A highly viscous, clear product is obtained, having an acid number of 99.5 and an epoxy group content of 0.3.

(I) 282 g. of a dimerised linoleic acid (=1 acid group equivalent) together with 98 g. (=0.5 epoxy group equivalent) of an epoxide formed from 2,2-bis-(4'-hydroxyphenyl)-propane and epichlorohydrin, are warmed for 5 hours to 150° C. internal temperature.

A highly viscous, clear product is obtained, having an acid number of 87.5 and an epoxy group content of 0.

EXAMPLE 1

71 g. of a product manufactured according to instruction A (0.1 acid equivalent) are dissolved in 71 g. of n-butylglycol and after adding 7.3 g. of triethylenetetramine (0.3 amine equivalent) the mixture is stirred for 1 hour at 60° C. Thereafter 230 g. of deionised water are added and the mixture is further stirred until cold. A clear solution is obtained, having a solids content of 20% and a pH value of 8.8.

EXAMPLE 2

87 g. of a product manufactured according to instruction B (0.1 acid equivalent) are dissolved in 87 g. of n-butylglycol and after adding 7.3 g. of triethylenetetramine (0.3 amine equivalent) the mixture is stirred for 1 hour at 60° C. Thereafter 275 g. of deionised water are added and the mixture is further stirred until cold. A 20% strength solution, having a pH value of 8.8, is obtained. A pH value of 9.2 is established by adding 6 g. of 24% strength ammonia.

EXAMPLE 3

106 g. of a product manufactured according to instruction C (0.1 acid equivalent) are dissolved in 106 g. of n-butylglycol, and after adding 7.3 g. of triethylenetetramine (0.3 amine equivalent), the mixture is stirred for 1 hour at 60° C. Thereafter, 320 g. of deionised water are added and the mixture is further stirred until cold. A pH value of 9.5 is established by adding 8 g. of 24% strength ammonia. A clear solution having a solids content of 20% is obtained.

EXAMPLE 4

77 g. of a product manufactured according to instruction D (0.05 acid equivalent) are dissolved in 66 g. of n-butylglycol and warmed for 1 hour to 60° C. together with 3.65 g. of triethylenetetramine (0.15 amine equivalent). Thereafter 8 g. of 24% strength ammonia and 245 g. of deionised water are added and the mixture is further stirred until cold. A clear solution having a solids content of 20% and a pH value of 9.6 is obtained.

EXAMPLE 5

87 g. of a product manufactured according to instruction B (0.01 acid equivalent) are dissolved in 87 g. of n-butylglycol and warmed for 1 hour to 60° C. together with 2.44 g. of triethylenetetramine (0.1 amine equivalent). Thereafter 8 g. of 24% strength ammonia and 250 g. of deionised water are added and the mixture is further stirred until cold.

A clear solution having a solids content of 20% and a pH value of 9.4 is obtained.

EXAMPLE 6

87 g. of a product manufactured according to instruction B (0.1 acid equivalent) are dissolved in 87 g. of n-butylglycol and warmed for 1 hour to 60° C. together with 12.1 g. of triethylenetetramine (0.5 amine equivalent). Thereafter 295 g. of deionised water are added and the mixture is further stirred until cold.

A clear solution having a solids content of 20% and a pH value of 9.5 is obtained.

EXAMPLE 7

87 g. of a product manufactured according to instruction B (0.1 acid equivalent) are dissolved in 87 g. of n-butylglycol and warmed for 1 hour to 60° C. together with 6.17 g. of diethylenetriamine (0.3 amine equivalent).

After adding 270 g. of deionised water, the mixture is further stirred until cold, and a clear solution having a solids content of 20% and a pH value of 9.2 is obtained.

EXAMPLE 8

77 g. of a product manufactured according to instruction D (0.05 acid equivalent) are dissolved in 66 g. of n-butylglycol and warmed for 1 hour to 60° C. together with 6.4 g. of 1-amino-3-aminomethyl-3,5,5-trimethylcyclohexane (=0.152 amine equivalent). Thereafter 11 g. of 24% strength ammonia and 247 g. of deionised water are added and the mixture is further stirred until cold. A clear solution having a solids content of 20% and a pH value of 9.7 is obtained.

EXAMPLE 9

50.5 g. of a product manufactured according to instruction D (=0.0328 acid equivalent) are dissolved in 50 g. of n-butylglycol and treated with 6 g. of 24% strength ammonia (=0.085 mol). Thereafter the mixture is diluted with 140 g. of deionised water and a clear solution having a solids content of 20% and a pH value of 9.8 is obtained.

EXAMPLE 10

77 g. of a product manufactured according to instruction D (0.05 acid equivalent) are dissolved in 66 g. of n-butylglycol and warmed for 1 hour to 60° C. together with 3.65 g. of triethylenetetramine (0.15 amine equivalent). Thereafter the product is diluted with 244 g. of n-butylglycol and stirred until cold.

A clear solution, having a solids content of 20% is obtained.

If a sample is diluted with water (1:10), a pH value of 7.8 is obtained.

EXAMPLE 11

45 g. of a product manufactured according to instruction B (0.0515 acid equivalent) are dissolved in 45 g. of n-butylglycol and stirred for 1 hour at 60° C. internal temperature, together with 3.76 g. of triethylenetetramine (0.155 amine equivalent). Thereafter 2 g. of 30% strength sodium hydroxide solution and 139 g. of deionised water are added and the mixture is further stirred until cold.

A clear solution having a solids content of 20% and a pH value of 9.1 is obtained.

EXAMPLE 12

87 g. of a product manufactured according to instruction B (0.1 acid equivalent) are dissolved in 87 g. of n-butylglycol and warmed for one hour to 60° C. internal temperature together with 14.6 g. of triethylenetetramine (0.6 amine equivalent). Thereafter the solution is cooled to −10° C. and a solution of 10 g. of hexamethylene-1,6-diisocyanate (0.119 isocyanate equivalent) in 50 g. of n-butylglycol is added dropwise over the course of one hour. Thereafter the mixture is stirred for a further 2 hours at room temperature and subsequently diluted with 383 g. of water, to which 25 g. of 24% strength ammonia are added beforehand. A mobile liquid having a solids content of 20% and a pH value of 9.8 is obtained.

EXAMPLE 13

43.5 g. of a product manufactured according to instruction B (0.05 acid equivalent) are dissolved in 43.5 g. of n-butylglycol and cooled to −10° C. internal temperature together with 2.1 g. of hexamethylene-1,6-diisocyanate (0.025 isocyanate equivalent). Thereafter a solution of 7.3 g. of triethylenetetramine (0.3 amine equivalent) in 50 g. of n-butylglycol is added dropwise over the course of 2 hours. Thereafter the mixture is stirred for a further 2 hours at room temperature and subsequently diluted with 132 g. of deionised water. A mobile liquid having a solids content of 20% and a pH value of 9.3 is obtained.

EXAMPLE 14

60 g. of a product manufactured according to instruction E (0.038 acid group equivalent) are dissolved in 60 g. of ethanol and treated with 6 g. of triethylamine (0.06 tert. amino group).

Thereafter the mixture is diluted with 168 g. of ethanol and a mobile, clear solution having a solids content of 20% is obtained. The product treated with water shows a pH value of 9.9.

EXAMPLE 15

73 g. of a product manufactured according to instruction F (0.08 acid group equivalent) are dissolved in 73 g. of isopropanol and warmed to 60° C. internal temperature.

A solution of 7.81 g. of triethylenetetramine (0.32 amine equivalent) and 7.8 g. of isopropanol is run in over the course of 30 minutes. Thereafter the mixture is stirred for a further hour at 60° C. and subsequently treated with 5 g. of 24% strength ammonia in 235 g. of deionised water.

A 20% strength solution having a pH value of 9.7 is obtained.

EXAMPLE 16

74.4 g. of a product manufactured according to instruction G (0.15 acid group equivalent) are dissolved in 74.4 g. of butylglycol and warmed to 60° C. internal temperature.

A solution of 14.6 g. of triethylenetetramine (=0.6 amine equivalent) and 14.6 g. of butylglycol is run over the course of 30 minutes.

Thereafter the mixture is stirred for a further hour at 60° C. and subsequently treated with 5 g. of 24% strength ammonia in 255 g. of deionised water. A 20% strength solution having a pH value of 9.5 is obtained.

EXAMPLE 17

84.6 g. of a product manufactured according to instruction H (=0.15 acid group equivalent) are dissolved in 84.6 g. of butylglycol and warmed to 60° C. internal temperature.

A solution of 22 g. of triethylenetetramine (=0.9 amine equivalent) and 22 g. of butylglycol is run in over the course of 30 minutes. Thereafter the mixture is stirred for a further 2 hours at 60° C. and subsequently treated with 310 g. of deionised water. A 20% strength solution having a pH value of 9.6 is obtained.

EXAMPLE 18

64.5 g. of a product manufactured according to instruction I (=0.1 acid group equivalent) are dissolved in 64.5 g. of butylglycol and warmed to 60° C. internal temperature.

A solution of 27 g. of tetraethylenepentamine (=1 amine equivalent) and 27 g. of butylglycol is run in over the course of 30 minutes. Thereafter the mixture is stirred for a further 30 minutes and then treated with 260 g. of deionised water. A 20% solution having a pH value of 9.8 is obtained.

EXAMPLE 19

64.5 g. of a product manufactured according to instruction I (=0.1 acid group equivalent) are dissolved in 64.5 g. of butylglycol and warmed to 60° C. internal temperature. A solution of 7.5 g. of ethylenediamine (0.5 amine equivalent) and 7.5 g. of butylglycol is run in over the course of 30 minutes.

Thereafter the mixture is stirred for a further 30 minutes and subsequently treated with 210 g. of deionised water. A 20% strength solution having a pH value of 9.6 is obtained.

EXAMPLE 20

64.5 g. of a product manufactured according to instruction I (=0.1 acid group equivalent) are dissolved in 64.5 g. of butylglycol. A solution of 22.9 g. of 1-amino-2-aminomethyl-cyclopentane (=0.8 amine equivalent) and 23 g. of butylglycol is run in over the course of 30 minutes. Thereafter the mixture is stirred for a further 30 minutes and subsequently treated with 270 g. of deionised water. A 20% strength solution having a pH value of 10.3 is obtained.

EXAMPLE 21

70 g. of a product manufactured according to instruction I (0.108 acid group equivalent) are dissolved in 70 g. of butylglycol and treated with 6.3 g. of N-tetramethyl-ethylenediamine (0.108 tert. amino group).

Thereafter the mixture is diluted with 225 g. of deionised water and a 20% strength solution having a pH value of 7.6 is obtained.

EXAMPLE 22

64.5 g. of a product manufactured according to instruction I (=0.1 acid group equivalent) are dissolved in 64.5 g. of butylglycol and after adding 14.6 g. of triethylenetetramine (=0.6 amine equivalent) the mixture is stirred for 1 hour at 60° C. Thereafter the product is cooled to −10° C. and 10.5 g. of toluylene-2,4-diisocyanate (=0.12 isocyanate equivalent) in 50 g. of butylglycol is run in over the course of 1 hour. The mixture is subsequently stirred for a further 2½ hours at room temperature and thereafter diluted with 20 g. of 24% strength ammonia in 220 g. of deionised water. A 20% strength solution having a pH value of 9.8 is obtained.

EXAMPLE 23

100 kg. of wool yarn are dyed with a reactive dyestuff in a circulation apparatus in the usual manner and then neutralised and rinsed. A fresh bath of 4000 kg. of water is now provided and warmed to 40° C. 10 kg. of the preparation according to Example 2 are then run into the circulation apparatus. After uniform distribution of the preparation according to Example 2, 4 kg. of glacial acetic acid are added. A fine dispersion is formed, which is uniformly absorbed on the wool yarn in 10 to 30 minutes. After 30 minutes, 1 kg. of a condensation product of 1 mol of tristearoyl-diethylenetriamine and 15 mols of ethylene oxide is added as the softener. The wool is then rinsed, centrifuged and dried at 80° C. The wool yarn is now non-felting according to the specifications of IWS 7B.

Similar results are obtained if, instead of the preparation according to Example 2, one of the preparations according to Examples 1 to 13 is used.

EXAMPLE 24

100 kg. of woolen pieces are first dyed in the usual manner in a piece winch. After a thorough rinsing process with cold water, a fresh treatment bath of 4000 litres of water is provided and warmed to 40° C.

10 kg. of the preparation according to Example 14 and 1.5 kg. of oxalic acid are then added. An emulsion forms in the treatment bath and is absorbed on the wool fabric in about 30 minutes.

3 kg. of sodium bisulfite, which is first dissolved in 10 litres of water, are then added to the bath.

After a further 10 minutes, 4 kg. of an approximately 20% strength aqueous softener emulsion, containing polyethylene possessing a few carboxyl groups and a fatty amine, are added, and after a further 15 minutes the pieces are twice rinsed cold. After drying, the fabric is non-felting according to IWS Specification 7B. Similar results are achieved with the preparations according to Examples 14 to 22.

We claim:

1. A process for finishing woolen material, which comprises treating the woolen material at 30 to 100° C. with an aqueous preparation of reaction products of epoxides, polymeric fatty acids and amines, said products being obtained by reacting (a) a reaction product of at least (a') one epoxide which contains at least two epoxide groups per molecule and at least (a'') one polymeric unsaturated fatty acid, derived from a fatty acid of 16 to 22 carbon atoms, with the ratio of equivalents of epoxide groups to acid groups being 0.45:1 to 0.95:1, with (b) ammonia or an aliphatic or cycloaliphatic amine which is a primary, secondary or tertiary amine containing no non-basic nitrogen atoms, in the presence of an organic solvent, with the ratio of equivalents of acid groups to hydrogen bonded amine nitrogen, to tertiary amino groups or to ammonia being 1:1 to 1:10, wherein the reaction between components (a) and (b) is carried out at a temperature in the range of 20 to 120° C., and then rinsing and drying the treated woolen material.

2. The process of claim 1, wherein an epoxide which is derived from a bisphenol is used as component (a').

3. The process of claim 1, wherein a polyglycidyl ether of 2,2-bis-(4'-hydroxyphenyl)-propane is used as component (a').

4. The process of claim 1, wherein the component (a') has an epoxide content of at least 5 epoxide group equivalents per kg.

5. The process of claim 1, wherein that a reaction product of epichlorohydrin with 2,2-bis-(4'-hydroxyphenyl)-propane is used as component (a').

6. The process of claim 1, wherein aliphatic, ethylenically unsaturated dimeric to trimeric fatty acids are used as component (a'').

7. The process of claim 1, wherein the fatty acid component (a'') is derived from an aliphatic monocarboxylic acid with 16 to 22 carbon atoms.

8. The process of claim 1, wherein characterised in that dimerised to trimerised linoleic or linolenic acid is used as component (a'').

9. The process of claim 1, wherein an amine containing at least two amino groups and exclusively basic nitrogen atoms, wherein the amino groups each possess at least one hydrogen atom bonded to nitrogen, or ammonia, is used as component (b).

10. The process of claim 1, wherein an aliphatic or cycloaliphatic amine which contains at least 2 amino groups, with at least one amino group being primary and another amino group containing at least one hydrogen atom bonded to nitrogen, is used as component (b).

11. The process of claim 1, wherein an aliphatic or cycloaliphatic amine containing at least two primary amino groups is used as component (b).

12. The process of claim 1, wherein an aliphatic polyamine of formula $$H_2N-(CH_2-CH_2-NH)_n-CH_2-CH_2-NH_2$$

wherein $n$ is equal to 1, 2 or 3, is used as component (b).

13. The process of claim 1, wherein the pH of the reaction mixture of components (a) and (b) is adjusted to 7.5 to 12, not later than on completion of the reaction.

14. The process of claim 13, wherein the pH value of the reaction mixture is adjusted to a value of 8 to 10.

15. The process of claim 1, wherein the woolen material is treated at a pH of 6 to 1.

16. The woolen material finished according to claim 1.

References Cited

UNITED STATES PATENTS

| | | | |
|---|---|---|---|
| 3,033,706 | 5/1962 | Pardo et al. | 117—141 X |
| 3,308,076 | 3/1967 | DeLia et al. | 260—404.5 X |
| 3,673,558 | 6/1972 | Toepfl et al. | 117—141 X |
| 2,890,184 | 6/1959 | Foerster | 260—404.5 |
| 3,397,178 | 8/1968 | Shackelford et al. | 260—404.5 X |

CHARLES E. VAN HORN, Primary Examiner

H. J. GWINNELL, Assistant Examiner

U.S. Cl. X.R.

117—161 UN, ZB, 167; 260—404.5